3,249,605
LOWER-ALKYL ESTERS OF 8-CHLORO-6-NITRO-2-OXO - 2H - 1,4 - BENZOXAZINE - 3 - LOWER-ALKANOIC ACIDS

Robert B. Moffett, Kalamazoo, Mich., assignor to The Upjohn Company, Kalamazoo, Mich., a corporation of Delaware
No Drawing. Filed Nov. 20, 1963, Ser. No. 325,177
2 Claims. (Cl. 260—244)

This invention relates to novel chemical compounds and to a process for preparing the same and is particularly directed to lower-alkyl esters of 8-chloro-6-nitro-2-oxo-2H-1,4-benzoxazine-3-lower-alkanoic acids and the preparation thereof.

The novel compounds of the invention have the following structural formula

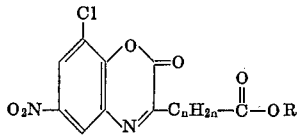

Formula I wherein $n$ is an integer of from 1 to 4, inclusive, and R is lower-alkyl, e.g., methyl, ethyl, propyl, butyl and the isomeric forms thereof.

The novel compounds of the invention are prepared by condensing 2-amino-6-chloro-4-nitrophenol with a di-lower-alkyl α-ketodicarboxylate according to the following equation

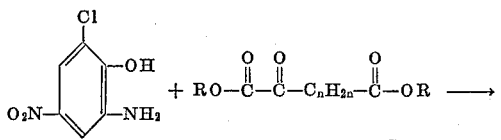

Compound of Formula I wherein $n$ and R are as defined above.

The condensation is accelerated by gentle heating (from room temperature, about 25° C., to about 180° C., the optimum temperature depending upon the nature of the R moiety), and if desired can be carried out in a non-oxidizing atmosphere, for example, nitrogen. The proportions of reactants can be varied over a wide range. Equimolar amounts can be used, though in general it is preferred to use an excess of the di-lower-alkyl α-ketodicarboxylate, say up to about 200% excess. An inert solvent, for example, toluene, ethanol, dioxane, or tetrahydrofuran can be used if desired.

The novel compounds of the Formula I have sedative and tranquilizing activity and can be used to calm agitated mammals or animals, e.g., laboratory rats and mice. The compounds of the Formula I also have shown antifungal activity, e.g., inhibit growth of *Trichophyton rubrum* and *Sclerotinia fructicola*. Further, the compounds have anorexigenic and anti-inflammatory activity and depress lipid metabolism in mammals or animals.

The invention can be more fully understood by reference to the following example, which is given by way of illustration and not of limitation.

EXAMPLE 1

*Ethyl 8-chloro-α-methyl-6-nitro-2-oxo-2H-1,4-benzoxazin-3-acetate*

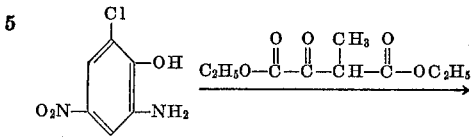

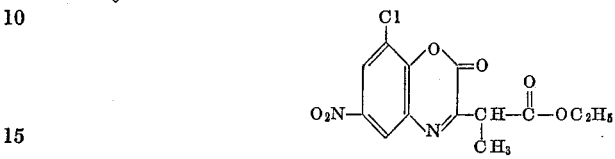

A mixture of 20 gm. (0.1 mole) of 2-amino-6-chloro-4-nitrophenol hydrate and 60.8 gm. (0.3 mole) of diethylmethyloxalacetate was heated with stirring in an oil bath at 160° C. for 3.5 hours. The mixture was then diluted with 250 ml. ethanol, cooled, and filtered to provide 8.2 gm. of solid having a melting point of 123–131° C. The solid was dissolved in 275 ml. of absolute ethanol, concentrated to about 200 ml., cooled, and the solid collected on a filter to provide 6.0 gm. (18.4% theory) of ethyl 8-chloro-α-methyl-6-nitro-2-oxo-2H-1,4-benzoxazin-3-acetate as a yellow solid having a melting point of 130–132° C.

*Analysis.*—Calcd. for $C_{13}H_{11}ClN_2O_6$: C, 47.79; H, 3.39; Cl, 10.85; N, 8.58. Found: C, 47.65; H, 3.75; Cl, 10.87; N, 8.40.

In place of the diethyl ester of methyloxalacetic acid there can be substituted any other di-lower-alkyl methyloxalacetate, e.g., the methyl, propyl, isopropyl, butyl, and sec-butyl esters to give the corresponding esters of 8-chloro-α-methyl-6-nitro-2-oxo - 2H- 1,4-benzoxazin-3-acetate.

The above methyloxalacetic acid esters can be replaced by the corresponding esters of oxalacetic, dimethyloxalacetic, ethylmethyloxalacetic, α-ketoglutaric, α-ketoadipic, and α-ketopimelic acids. There can be thus obtained the corresponding lower-alkyl esters of 8-chloro-6-nitro-2-oxo-2H-1,4-benzoxazine-3-lower-alkanoic acids.

What is claimed is:
1. A compound of the formula

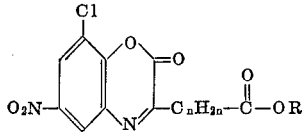

wherein $n$ is an integer of from 1 to 4, inclusive, and R is lower-alkyl.

2. Ethyl 8-chloro-α-methyl-6-nitro-2-oxo-2H-1,4-benzoxazin-3-acetate.

References Cited by the Examiner

UNITED STATES PATENTS 3,105,071    9/1963    Moffett _____ 260—244

FOREIGN PATENTS 563,113    12/1957    Belgium.

WALTER A. MODANCE, *Primary Examiner.*

ROBERT T. BOND, *Assistant Examiner.*